(12) United States Patent
Nakayama (10) Patent No.: US 11,076,061 B2
(45) Date of Patent: Jul. 27, 2021

(54) INFORMATION PROCESSING APPARATUS AND SYSTEM AND NON-TRANSITORY COMPUTER READABLE MEDIUM THAT STORES ENVIRONMENTAL INFORMATION WHEN PROVIDING A SERVICE HAS PREVIOUSLY FAILED (71) Applicant: FUJIFILM BUSINESS INNOVATION CORP., Tokyo (JP)

(72) Inventor: Hidetomo Nakayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/775,363

(22) Filed: Jan. 29, 2020

(65) Prior Publication Data
US 2021/0014367 A1 Jan. 14, 2021

(30) Foreign Application Priority Data
Jul. 9, 2019 (JP) .............................. JP2019-127716

(51) Int. Cl.
*H04N 1/00* (2006.01)
*G06F 3/12* (2006.01)

(52) U.S. Cl.
CPC ......... *H04N 1/00344* (2013.01); *G06F 3/121* (2013.01); *G06F 3/1231* (2013.01); *G06F 3/1234* (2013.01)

(58) Field of Classification Search
None
See application file for complete search history.

(56) References Cited

U.S. PATENT DOCUMENTS
9,569,157 B2 2/2017 Ochi

FOREIGN PATENT DOCUMENTS
JP 2016-86379 A 5/2016

*Primary Examiner* — Lennin R RodriguezGonzalez
(74) *Attorney, Agent, or Firm* — Oliff PLC (57) ABSTRACT

An information processing apparatus includes an obtaining unit and a controller. The obtaining unit obtains environment information concerning a user terminal when a service request is received from the user terminal. Providing of a service to the user terminal has previously failed. The controller performs control to store the environment information obtained by the obtaining unit in a storage device. Data is read from and written into the storage device without operating the user terminal.

14 Claims, 7 Drawing Sheets

| ERROR DATE | IP ADDRESS | PRINT MANAGEMENT ID | ERROR CODE |
|---|---|---|---|
| JULY 20, 2019  09:53:22 | 196.26.0.32 | PR001 | ER-006 |
| JULY 21, 2019  15:04:46 | 196.26.0.17 | PR002 | ER-008 |
| : | : | : | : |

| ERROR DATE | IP ADDRESS | PRINT MANAGEMENT ID | ERROR CODE | APPLICATION NAME |
|---|---|---|---|---|
| JULY 20, 2019  09:53:22 | 196.26.0.32 | PR001 | ER-006 | APPLICATION A |
| JULY 21, 2019  15:04:46 | 196.26.0.17 | PR002 | ER-008 | APPLICATION B |
| : | : | : | : | : |

4A

INFORMATION PROCESSING APPARATUS AND SYSTEM AND NON-TRANSITORY COMPUTER READABLE MEDIUM THAT STORES ENVIRONMENTAL INFORMATION WHEN PROVIDING A SERVICE HAS PREVIOUSLY FAILED

CROSS-REFERENCE TO RELATED APPLICATIONS

This application is based on and claims priority under 35 USC 119 from Japanese Patent Application No. 2019-127716 filed Jul. 9, 2019.

BACKGROUND

(i) Technical Field

The present disclosure relates to an information processing apparatus, an information processing system, and a non-transitory computer readable medium.

(ii) Related Art

Japanese Unexamined Patent Application Publication No. 2016-86379 discloses the following network system. The network system includes plural image forming devices connected to a network and a cloud server that sends and receives information to and from the plural image forming devices. Each of the image forming devices includes a device information storage, a sender, and a controller. The device information storage stores device information. The sender sends the device information to the cloud server and receives information from the cloud server. The controller controls the operation of the image forming device, based on information from the cloud server. The cloud server includes a user information storage and an analyzer. The user information storage stores user information associated with each of the plural image forming devices. When an event that requires maintenance management has occurred in an image forming device, the image forming device sends the device information to the cloud server. The analyzer identifies this image forming device among the plural image forming devices from the device information, and causes the cloud server to send maintenance information corresponding to the image forming device. The controller controls the operation of the image forming device, based on the maintenance information received from the cloud server.

SUMMARY

An information processing apparatus, such as a printer, provides a service for forming an image on a recording medium in response to a request from a user. The printer may fail to provide a service due to the occurrence of an error. In this case, the user may ask a maintenance operator of the printer to find out the cause of the error.

If the maintenance operator is unable to find out the cause of the error only from information recorded in the printer, it may obtain information recorded in a user terminal used for making a print request by the user.

However, if the user terminal is being used when the maintenance operator tries to obtain information, the operation of the user terminal may be interrupted or the load on the user terminal may be increased.

Aspects of non-limiting embodiments of the present disclosure relate to an information processing apparatus, an information processing system, and a non-transitory computer readable medium in which, when the information processing apparatus has failed to provide a service requested by a user from a user terminal, a maintenance operator of the information processing apparatus is able to investigate the cause of the failure without operating the user terminal.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an obtaining unit and a controller. The obtaining unit obtains environment information concerning a user terminal when a service request is received from the user terminal. Providing of a service to the user terminal has previously failed. The controller performs control to store the environment information obtained by the obtaining unit in a storage device. Data is read from and written into the storage device without operating the user terminal.

BRIEF DESCRIPTION OF THE DRAWINGS

An exemplary embodiment of the present disclosure will be described in detail based on the following figures, wherein.

DETAILED DESCRIPTION

An exemplary embodiment of the disclosure will be described below with reference to the accompanying drawings. Elements having the same functions are designated by like reference numeral in the drawings and an explanation thereof will not be repeated. Operations having the same functions are designated by like step number in the drawings and an explanation thereof will not be repeated.

Exemplary Embodiment

Figure 1:
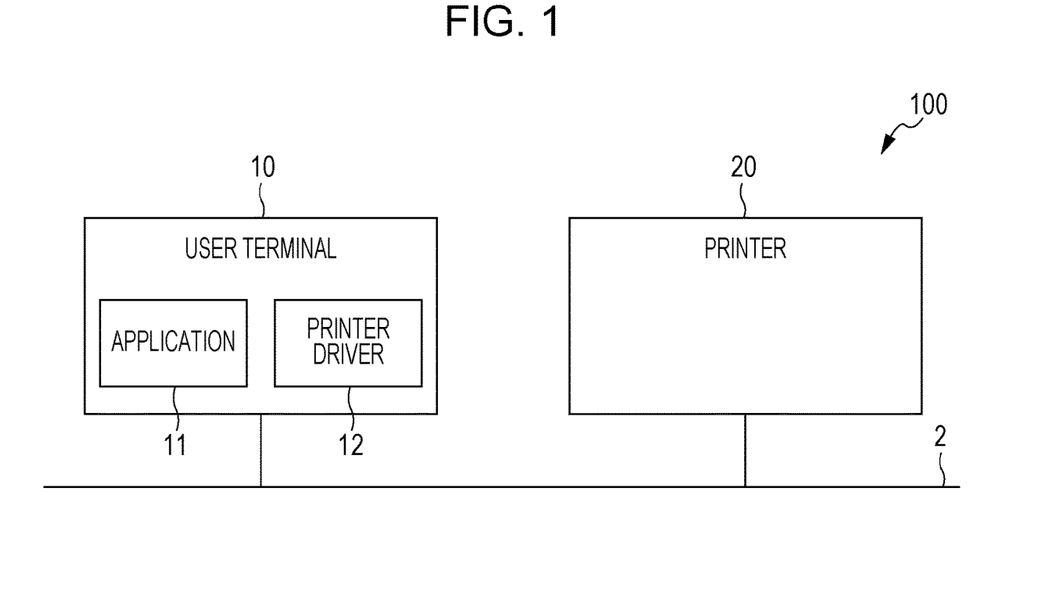
FIG. 1 is a schematic diagram illustrating an example of the system configuration of an information processing system.

FIG. 1 is a schematic diagram illustrating an example of the system configuration of an information processing system 100 according to the exemplary embodiment.

The information processing system 100 includes a user terminal 10 and a printer 20 that are connected to each other via a communication network 2.

The user terminal 10 is a terminal used by a user to request the printer 20 to form an image. The image is information that can be visually identified by a user. As well as illustrations and photos, a document constituted by characters, is also an example of the image.

The user terminal 10 includes an application 11 and a printer driver 12. The application 11 is software which converts an image into data in a predetermined file format so as to generate image data. The file is a set of data items which convey a certain meaning as a whole. Data items are arranged for each file format in accordance with a predetermined common form. This enables an information processing apparatus to read the content of the file.

To cause the printer 20 to form an image corresponding to image data generated by the application 11 on a recording medium, the application 11 supplies the generated image data to the printer driver 12 and requests it to execute the following processing. Hereinafter, forming an image on a recording medium in the printer 20 will simply be called printing.

The printer driver 12 is software created in accordance with the type of printer 20 and is connected to the printer 20 via the communication network 2. The printer driver 12 converts a print request into a language that can be interpreted by the printer 20 and sends the converted print request to the printer 20. The print request includes image data received from the application 11 and print conditions set by a user. As a result, an image corresponding to the image data can be printed in the printer 20 in accordance with the print conditions.

The print conditions are items of information constituted by at least one of an instruction concerning a print mode in the printer 20, an instruction concerning the appearance of an image formed on a recording medium by the printer 20, and an instruction concerning a recording medium on which an image is formed. An example of the instruction concerning the print mode is an instruction regarding whether to use security/private printing. Security/private printing is a mode in which a print request is first stored in the printer 20 and printing is started after a user logs in the printer 20. Examples of the instruction concerning the appearance of an image are instructions regarding a color mode, resolution, and whether to use single-sided printing or double-sided printing. Examples of the instruction concerning a recording medium are instructions regarding the sheet size and whether to use postprocessing functions, such as sorting, punching, and stapling on a printed recording medium.

As described above, the printer driver 12 converts a print request into a language that can be interpreted by the printer 20. As this language, a page description language (PDL) may be used. The PDL describes the content of image data page by page by using commands. A print request, which requests the printer 20 to print image data in accordance with the print conditions set by a user, is formed as PDL data. A print request, which requests the printer 20 to provide an image forming service, is an example of a service request in the exemplary embodiment.

In accordance with a print request received from the user terminal 10, the printer 20 forms an image corresponding to image data included in the print request in a specified print mode and on a specified recording medium.

Any type of communication protocol may be used in the communication network 2 that connects the user terminal 10 and the printer 20. The communication network 2 may be a wired network, a wireless network, or a wired-and-wireless network. The communication network 2 may be a private network, or may alternatively be a public network, such as the internet, shared by many and unspecified users.

Only the single user terminal 10 and the single printer 20 are included in the information processing system 100 shown in FIG. 1. However, any number of user terminals 10 and any number of printers 20 may be included in the information processing system 100. For example, one user terminal 10 may be connected to plural printers 20, and a user may select one of the printers 20 to print an image.

Figure 2:
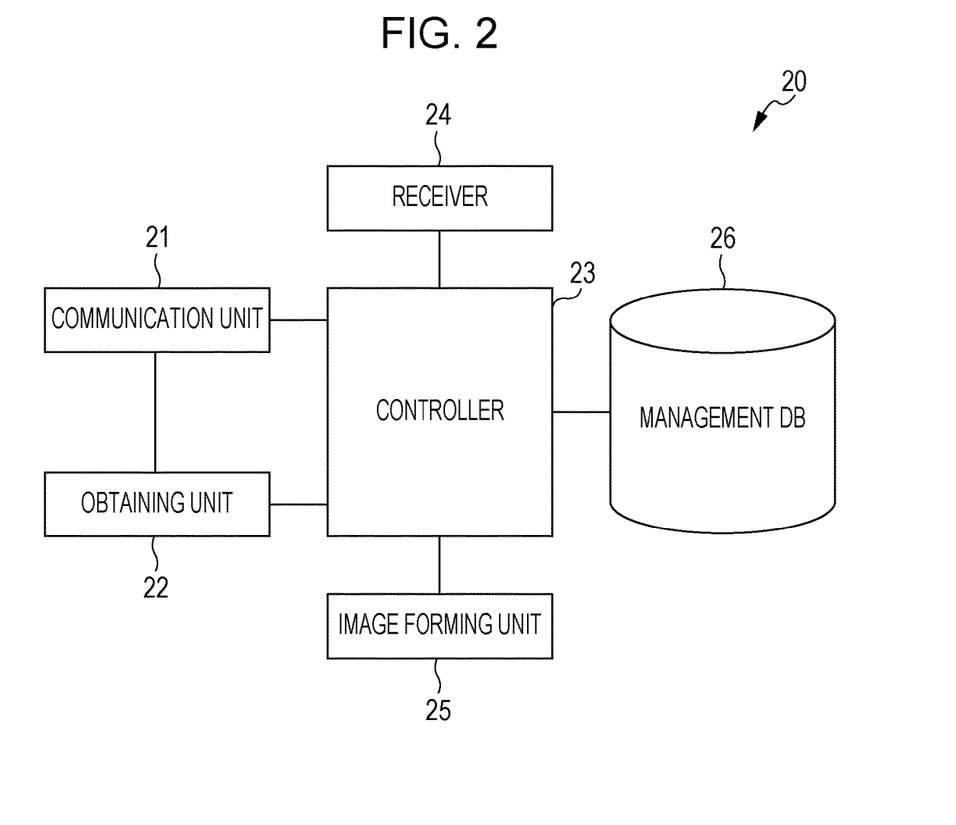
FIG. 2 is a block diagram illustrating an example of the functional configuration of a printer.

FIG. 2 is a block diagram illustrating an example of the functional configuration of the printer 20. As shown in FIG. 2, the printer 20 includes functions, such as a communication unit 21, an obtaining unit 22, a controller 23, a receiver 24, and an image forming unit 25. The printer 20 also includes a management database (DB) 26.

The communication unit 21 connects to the communication network 2 to perform data communication with the user terminal 10 and other external devices (not shown) connected to the communication network 2. That is, various messages, such as print requests, sent from the user terminal 10 are processed and received by the communication unit 21.

If environment information concerning a user terminal 10 is included in messages received by the communication unit 21, the obtaining unit 22 obtains the environment information.

Environment information concerning a user terminal 10 is information concerning a user terminal 10 that has sent a print request. The environment information includes, not only information concerning the content of image data and print conditions, but also information concerning a user terminal 10. Specific examples of the environment information concerning a user terminal 10 are information about an operating system (OS), such as the name and the version of the OS, the usage situation of resources installed in the user terminal 10, such as the memory space, memory usage, and central processing unit (CPU) load average, and information concerning software (software version, for example), such as the application 11 and the printer driver 12, used in the user terminal 10.

Another example of the environment information concerning a user terminal 10 is information concerning the content of settings set by the printer driver 12 in accordance with a print request, that is, print conditions set by a user, PDL commands included in the print request, and parameters added to the commands. Attributes representing the characteristics of an image, such as the size of image data, are also an example of the environment information concerning a user terminal 10.

The content of the settings set by the printer driver 12 is stored in the printer driver 12 as DEVMODE information, for example. Attributes of an image are stored in the printer driver 12 as JOB_INFO information, for example.

The environment information concerning a user terminal 10 is not supplied from all user terminals 10 sending print requests, but only from a user terminal 10 to which the printer 20 has previously failed to provide a print service. This will be discussed later.

The controller 23 controls the image forming unit 25, which will be discussed later, so that the image forming unit 25 prints an image in accordance with a print request received by the communication unit 21 from a user terminal 10. If an error occurs during a printing process and image printing has not successfully been completed, the controller 23 stores environment information concerning the user terminal 10 obtained by the obtaining unit 22 in the management DB 26, for example, in association with print management identification (ID).

The print management ID is an identifier for uniquely identifying a print request received by the communication unit 21. The controller 23 appends a print management ID to each of print requests received from the user terminals 10 to internally manage the print requests.

The reasons why printing of an image requested by a print request has failed are largely divided into two types of causes.

The first type of cause is the physical state of the printer 20. For example, although the printer 20 is capable of printing an image in accordance with the print conditions included in a print request, printing has failed because the printer 20 is broken or is short of consumables used in the printer 20. For example, a discharge roller for discharging a printed recording medium is broken, and a printed recording medium is not output from the printer 20. A recording medium of a sheet size specified in the print request is not stored in a sheet feeding tray of the printer 20.

The second type of cause is processing executed by a user terminal 10 that has generated a print request. For example, the printer 20 is unable to satisfy the print conditions included in a print request received from a user terminal 10 or to interpret the content of a print request. For example, the version of the printer driver 12 used in the user terminal 10 is not compatible with the printer 20. As a result, non-standard values are set in parameters of the PDL commands describing a print request, or PDL commands in a print request are not interpretable by the printer 20.

Errors due to the first type of cause (hereinafter called "errors caused by the printer 20") can be handled by a user refilling consumables or a maintenance operator replacing a broken part of the printer 20 by a new one, for example.

In the case of errors due to the second type of cause (hereinafter called "errors caused by a user terminal 10"), however, the reason why image printing has failed is not detectable only by a maintenance operator checking the physical state of the printer 20. In addition to the checking of the physical state of the printer 20, it is necessary to check environment information concerning the user terminal 10 that has sent a print request, such as the types of OS and application 11 used in the user terminal 10 and the version of the printer driver 12.

If an error caused by a user terminal 10 has occurred during an image printing process and image printing in response to a print request has failed, the controller 23 stores environment information concerning the user terminal 10 obtained by the obtaining unit 22 in the management DB 26, for example, in association with the print management ID.

In the exemplary embodiment, a failure to finish image printing in response to a print request due to an error caused by a user terminal 10 will simply be called "a failure in image printing" or "image printing has failed", unless otherwise stated.

As stated above, not all the user terminals 10 send environment information to the printer 20. The controller 23 thus checks a list 4 managed by the management DB 26. When image printing in response to a print request received from a user terminal 10 has failed, and if this user terminal 10 is registered in the list 4, the controller 23 causes the obtaining unit 22 to obtain environment information concerning this user terminal 10.

Figure 3:
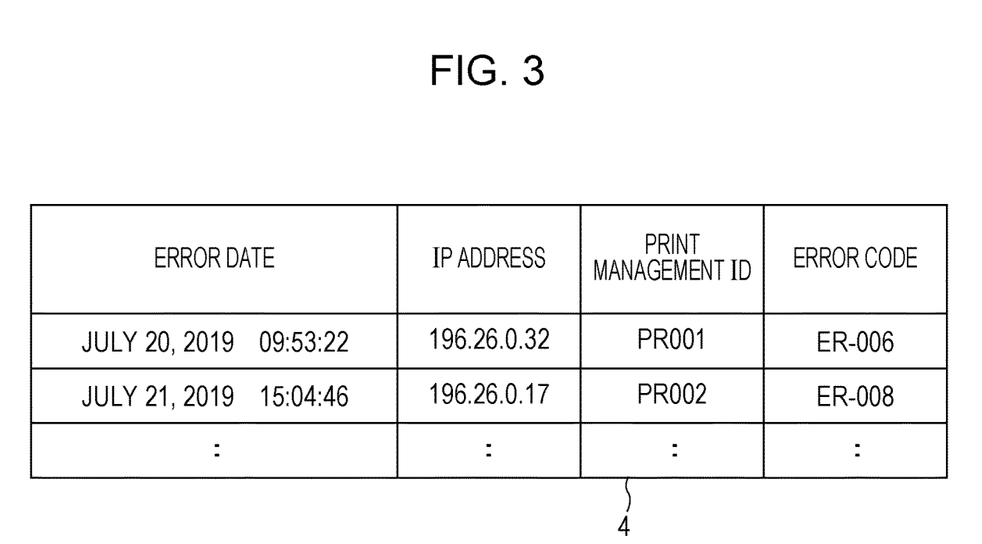
FIG. 3 illustrates an example of a list.

The management DB 26 is a management mechanism for managing the list 4 and environment information. The list 4 is history information generated by the controller 23 to record a situation where image printing has failed in the printer 20. FIG. 3 illustrates an example of the list 4 managed by the management DB 26.

The list 4 has fields regarding the error date, Internet Protocol (IP) address, print management ID, and error code. Individual items of a record are input into the corresponding fields in association with each other in the same row so as to be registered in the list 4. The items of a record input in the same row may also be called list elements.

In the error date field, the date on which image printing has failed is set.

In the IP address field, the IP address of a user terminal 10 that has sent a print request for printing an image which has resulted in a failure is set. The IP address is information for uniquely identifying an individual user terminal 10, and is thus an example of information concerning a service requester in the exemplary embodiment. As this information, any type of information may be used if it indicates a requester which makes a request for a print service to be provided by the printer 20. Instead of the IP address, the user ID for uniquely identifying an individual user or the serial number of a user terminal 10 that has sent a print request may be set in the list 4. The list 4 including information concerning a service requester is an example of requester information.

In the print management ID field, a print management ID appended to a print request for printing an image which has resulted in a failure is set.

In the error code field, information indicating what type of error has occurred in the printer 20 to cause a failure in image printing is set. Error code is assigned to each error type. For example, if the printer 20 has failed to interpret a command in PDL data, "ER-006" is set. If the printer 20 is not capable of satisfying the print conditions included in a print request, "ER-008" is set. In the error code field, error code assigned to the type of error occurred in the printer 20 is set.

Fields included in the list 4 are not limited to those shown in FIG. 3. For example, the user ID of a user having operated a user terminal 10 and requested the printer 20 to provide a print service may be added to the list 4.

As discussed above, the print management ID is also appended to environment information concerning a user terminal 10 that has sent a print request for printing an image which has resulted in a failure, and then, the environment information is managed by the management DB 26. The print management ID can thus associate the list 4 and environment information with each other. That is, as a result of checking the list 4, it is possible to identify the situation about the printer 20 and recorded by the printer 20 when image printing has failed and also to obtain environment information concerning the user terminal 10 that has caused this failure.

The receiver 24 receives an instruction from a user or a maintenance operator and supplies the received instruction to the controller 23. The controller 23 controls the individual functions of the printer 20 so that various processing operations can be executed in accordance with the received instruction.

Under the control of the controller 23, the image forming unit 25 forms an image corresponding to image data included in a print request received from a user terminal 10 on a recording medium in accordance with print conditions included in the print request. The image forming unit 25 then supplies a print result indicating whether printing has successfully been completed to the controller 23. The controller 23 refers to the print result supplied from the image forming unit 25, and if the print result shows that printing has failed due to an error caused by the user terminal 10, the controller 23 checks the list 4 to see whether the user terminal 10 is registered in the list 4. If the print terminal 10 is registered in the list 4, the controller 23 causes the obtaining unit 22 to obtain environment information concerning the user terminal 10, which is used for investigating the cause of the printing failure. Details of this processing will be discussed later.

Figure 4:
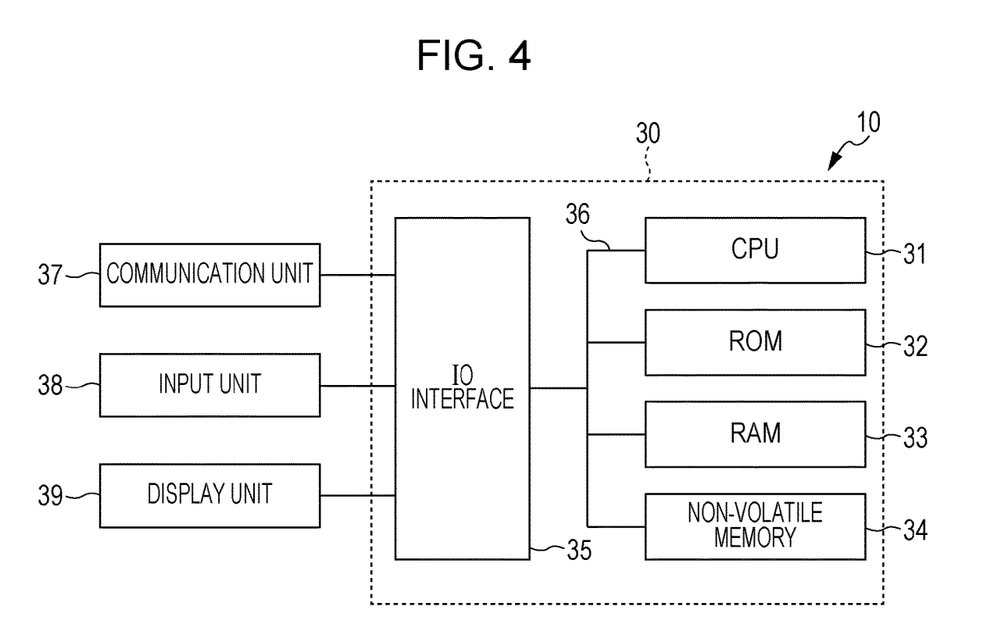
FIG. 4 illustrates examples of the major elements of the electrical system configuration of a user terminal.

Examples of the major elements of the electrical system configuration of the user terminal 10 will now be described below.

FIG. 4 illustrates examples of the major elements of the electrical system configuration of the user terminal 10. The user terminal 10 is constituted by a computer 30, for example.

The computer 30 includes a CPU 31, a read only memory (ROM) 32, a random access memory (RAM) 33, a non-volatile memory 34, and an input/output (IO) interface 35. The CPU 31 serves as a sender that sends a print request to the printer 20 and a controller that causes the sender to send environmental information concerning the user terminal 10 to the printer 20 if necessary. The ROM 32 stores a terminal program for causing the computer 30 to serve as the individual elements of the user terminal 10. The RAM 33 is used as a temporary work area for the CPU 31. The CPU 31, the ROM 32, the RAM 33, the non-volatile memory 34, and the IO interface 35 are connected to one another via a bus 36.

The non-volatile memory 34 is an example of a storage device that can retrieve stored information even after power supplied to the non-volatile memory 34 is interrupted. As the non-volatile memory 34, a semiconductor memory, for example, is used, or a hard disk may alternatively be used. The management DB 26 of the user terminal 10 is constructed in the non-volatile memory 34, for example.

A communication unit 37, an input unit 38, and a display unit 39, for example, are connected to the IC interface 35.

The communication unit 37 has a communication protocol for connecting to the communication network 2 and performing data communication with devices connected to the communication network 2, such as the printer 20.

The input unit 38 is a device that receives an instruction from a user and supplies this instruction to the CPU 31. Examples of the input unit 38 are buttons, a touchscreen, a keyboard, and a mouse. If a user instruction is given by voice, a microphone may be used as the input unit 38.

The display unit 39 is an example of a device that displays information processed by the CPU 31 for a user. Examples of the display unit 39 are a liquid crystal display and an organic electroluminescence (EL) display.

Units to be connected to the IC interface 35 are not limited to those shown in FIG. 4. Another unit may be connected to the IC interface 35 if necessary. For example, a memory card unit that writes data into a memory card inserted in a slot and reads data from the memory card may be connected to the IC interface 35.

Figure 5:
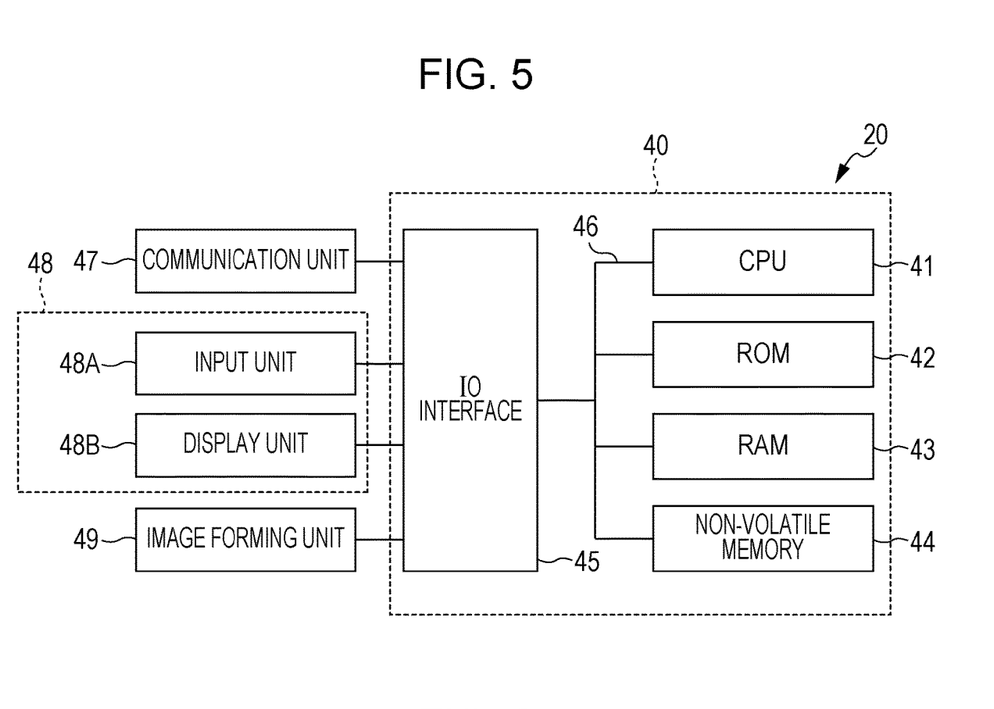
FIG. 5 illustrates examples of the major elements of the electrical system configuration of a printer.

FIG. 5 illustrates examples of the major elements of the electrical system configuration of the printer 20. The printer 20 is constituted by a computer 40, for example.

The computer 40 includes a CPU 41, a ROM 42, a RAM 43, a non-volatile memory 44, and an IO interface 45. The CPU 41 implements the individual functions of the printer 20. The ROM 42 stores an information processing program for causing the computer 40 to serve as the individual functions shown in FIG. 2. The RAM 43 is used as a temporary work area for the CPU 41. The CPU 41, the ROM 42, the RAM 43, the non-volatile memory 44, and the IO interface 45 are connected to one another via a bus 46.

A communication unit 47, an operation unit 48, and an image forming unit 49, for example, are connected to the IO interface 45.

The communication unit 47 has a communication protocol for connecting to the communication network 2 and performing data communication with other devices, such as the user terminal 10, connected to the communication network 2.

The operation unit 48 provides an interface with the printer 20 to a user and a maintenance operator. The operation unit 48 includes an input unit 48A and a display unit 48B.

The input unit 48A is a device that receives an instruction from a user or a maintenance operator and supplies this instruction to the CPU 41. Examples of the input unit 48A are buttons, a touchscreen, and a pointing device. If a user or a maintenance operator gives an instruction by voice, a microphone may be used as the input unit 48A.

The display unit 48B is an example of a device that displays information processed by the CPU 41 for a user and a maintenance operator. Examples of the display unit 48B are a liquid crystal display and an organic EL display.

A touchscreen, which is an example of the input unit 48A, is fixed on the display unit 48B. When a button on a screen displayed on the display unit 48B is pressed, information concerning the position of the pressed button is input into the touchscreen, and processing corresponding to the pressed button is executed by the CPU 41.

The image forming unit 49 is a unit that prints an image corresponding to image data included in a print request in accordance with an instruction from the CPU 41. Any printing method, such as the electrophotographic system or the inkjet method, may be used in the image forming unit 49.

A description will be given, with reference to FIG. 6, an example of a sequence of sending and receiving messages between the user terminal 10 and the printer 20 to print an image selected by a user by using the printer 20.

To allow a user to print an image generated by using the application 11 of the user terminal 10, when a print setting screen for setting print conditions and other settings is displayed, the application 11 sends a print preparation instruction to the printer driver 12.

Figure 6:
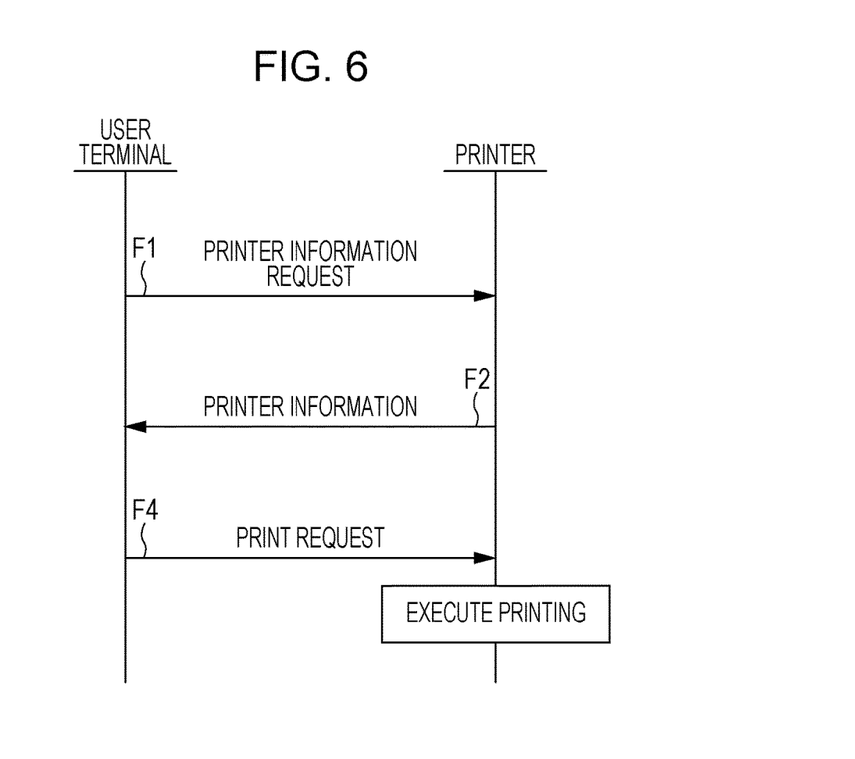
FIG. 6 is a sequence diagram illustrating an example of a sequence of sending and receiving messages between a user terminal and a printer.

Upon receiving the print preparation instruction, the printer driver 12 sends a printer information request to the printer 20 compatible with the printer driver 12 of the user terminal 10 so as to request the printer 20 to send printer information to the user terminal 10 (see F1 in FIG. 6). If multiple printers 20 are connected to the user terminal 10, the application 11 sends the print preparation instruction to the printer driver 12 compatible with the printer 20 selected by the user.

The printer information is information concerning the printer 20 selected to form an image. The printer information indicates printable sheet sizes, image resolution, availability of a two-sided printing function, and capabilities of the printer 20, for example. If the user terminal 10 is registered in the list 4, information managed in the printer 20, such as the list 4, is included in the printer information.

Upon receiving the printer information request, the printer 20 generates printer information and sends it to the user terminal 10 that has sent the printer information request (see F2 in FIG. 6).

Upon receiving the printer information from the printer 20, the printer driver 12 of the user terminal 10 extracts information concerning the capabilities of the printer 20 from the printer information and supplies this information to the application 11. This enables the user to set print conditions while checking the capabilities of the printer 20 on the print setting screen.

When the user has set print conditions and pressed a print execute button displayed on the print setting screen, a print execute instruction is supplied from the application 11 to the printer driver 12. Upon receiving the print execute instruction, the printer driver 12 generates a print request and sends it to the printer 20 that has sent the printer information (see F4 in FIG. 6).

If the list 4 is included in the printer information received from the printer 20 and if the IP address of the user terminal 10 is registered in the list 4, the printer driver 12 obtains environment information concerning the user terminal 10 and adds the environment information to the print request.

The printer driver 12 selects information related to the overall print request, such as OS information, resource usage information, software information, and image attributes, from the environment information. The printer driver 12 then includes the selected items of information as a PDL comment in a portion of the print request where information concerning the overall print request is described, such as in the header of the print request. Unlike PDL commands that influence the operation of the printer 20, the PDL comment is a memo (additional information) addressed to an operator analyzing the content of the print request, such as a maintenance operator.

The printer driver 12 selects information which is set page by page, such as DEVMODE information, from the environment information, and includes the selected information in the corresponding pages as a PDL comment. The printer driver 12 may also include as a PDL comment a drawing instruction supplied from the application 11 in the environment information.

Upon receiving the print request, the printer 20 prints an image corresponding to image data included in the print request in accordance with the print conditions included in the print request.

Figure 7:
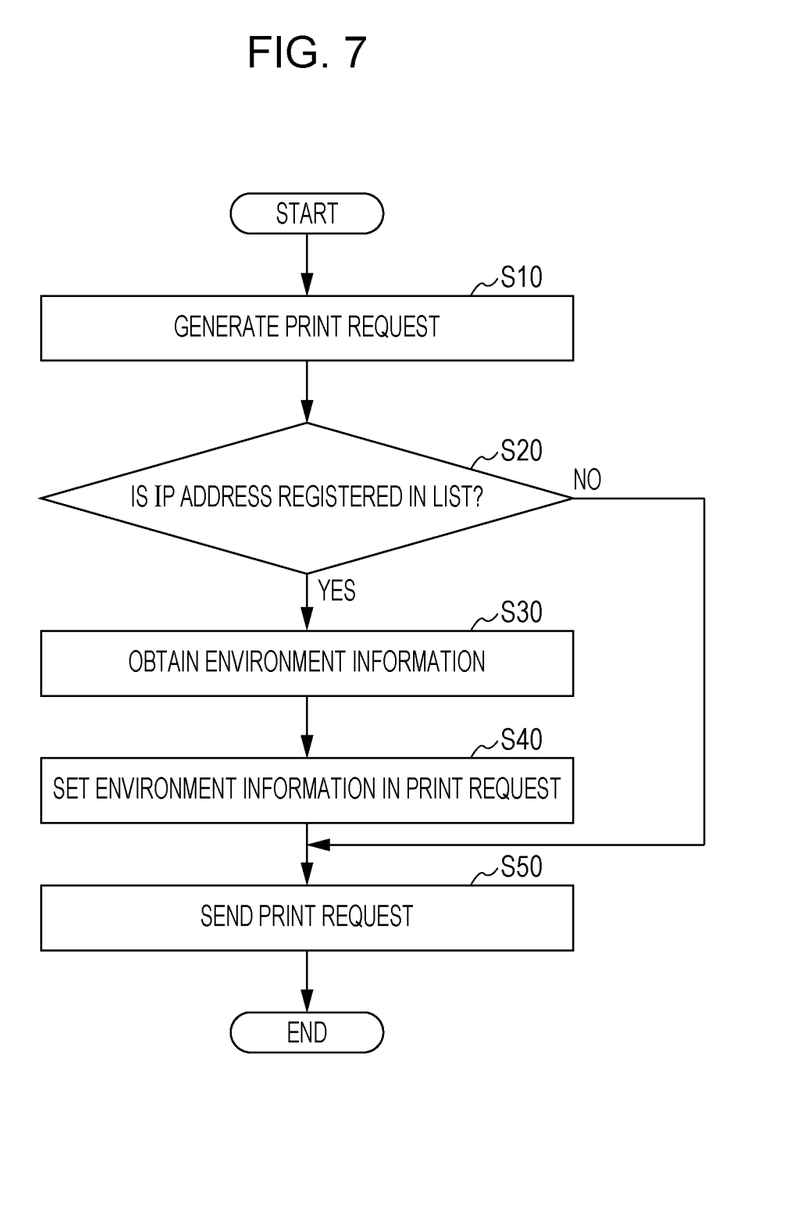
FIG. 7 is a flowchart illustrating an example of print request processing executed by a user terminal.

FIG. 7 is a flowchart illustrating an example of print request processing executed by the CPU 31 of the user terminal 10. Print request processing is executed when the user terminal 10 has received printer information from the printer 20 and the user has pressed the print execute button displayed on the print setting screen of the application 11 in the sequence diagram of FIG. 6. The terminal program that describes print request processing is stored in the ROM 32 of the user terminal 10, for example. The CPU 31 of the user terminal 10 reads the terminal program from the ROM 32 and executes print request processing.

It is assumed that, when sending printer information to the user terminal 10, the printer 20 adds the list 4 to the printer information.

In step S10, the CPU 31 converts subject image data and print conditions set by a user into PDL data so as to generate a print request.

In step S20, the CPU 31 judges whether the IP address of the user terminal 10 is registered in the list 4 received from the printer 20.

If the IP address of the user terminal 10 is registered in the list 4, the CPU 31 proceeds to step S30.

If the IP address of the user terminal 10 is registered in the list 4, it means that printing of an image requested by the user terminal 10 has previously failed in the printer 20.

In step S30, in case a printing failure occurs, the CPU 31 obtains preset environment information from the user terminal 10, which may be used by a maintenance operator to investigate the cause of a future error.

In step S40, the CPU 31 sets the environment information obtained in step S30 in the print request generated in step S10, and then proceeds to step S50.

If it is judged in step S20 that the IP address of the user terminal 10 is not registered in the list 4, it means that printing of an image requested by the user terminal 10 has never failed in the printer 20. The CPU 31 thus proceeds to step S50 by skipping steps S30 and S40.

In step S50, the CPU 31 sends the generated print request to the printer 20 (see F4 in FIG. 6). As a result of executing the above-described operation, if the IP address of the user terminal 10 is included in the list 4, a print request including environment information is sent to the printer 20. If the IP address of the user terminal 10 is not included in the list 4, a print request without environment information is sent to the printer 20.

As a result of executing the above-described operation, print request processing shown in FIG. 7 is completed.

The operation executed by the printer 20 will now be discussed.

Figure 8:
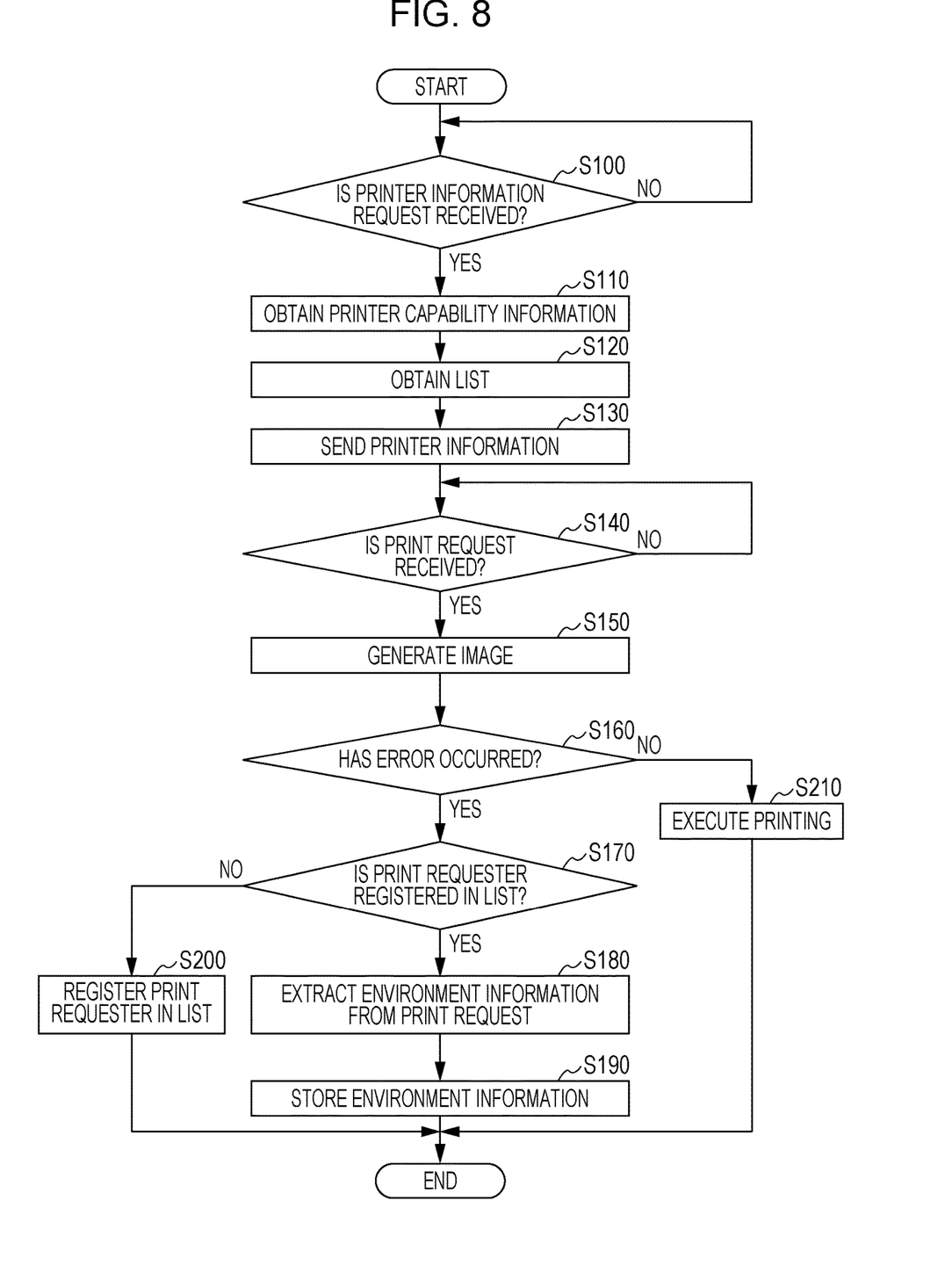
FIG. 8 is a flowchart illustrating an example of print processing executed by a printer.

FIG. 8 is a flowchart illustrating an example of print processing executed by the CPU 41 of the printer 20 when the printer 20 is started. The information processing program that describes print processing is stored in the ROM 42 of the printer 20, for example. The CPU 41 of the printer 20 reads the information processing program from the ROM 42 and executes print processing.

When a user requests the printer 20 to print an image, the user terminal 10 first sends a printer information request to the printer 20 (see F1 in FIG. 6).

In step S100, the CPU 41 thus judges whether a printer information request is received from the user terminal 10. If a printer information request is not received, the CPU 41 monitors the receiving situation of a printer information request by repeatedly executing step S100. If a printer information request is received, the CPU 41 proceeds to step S110.

In step S110, the CPU 41 obtains information concerning the capabilities of the printer 20 (printer capability information).

In step S120, the CPU 41 obtains the list 4 from the management DB 26 constructed in the non-volatile memory 44, for example. Instead of in the non-volatile memory 44, the management DB 26 may be constructed in a storage device from and into which data can be read and written without operating the user terminal 10. More specifically, the management DB 26 may be constructed in an external device (not shown) connected to the communication network 2. In this case, the CPU 41 obtains the list 4 from this external device via the communication unit 47.

In step S130, the CPU 41 generates printer information including the printer capability information obtained in step S110 and the list 4 obtained in step S120, and sends the generated printer information to the user terminal 10 that has sent the printer information request (see F2 in FIG. 6).

To handle a print request from the user terminal 10 that has received the printer information (see F4 in FIG. 6), the CPU 41 first judges in step S140 whether a print request is received. If a print request is not received, the CPU 41 monitors the receiving situation of a print request by repeatedly executing step S140. If a print request is received, the CPU 41 proceeds to step S150.

In step S150, to manage the print request received in step S140, the CPU 41 appends a print management ID to the print request. The CPU 41 then interprets PDL commands in the print request received in step S140 and converts image data included in the print request into an image of a format that can be drawn by the printer 20, such as a raster image or a vector image, in accordance with the print conditions included in the print request.

In step S160, the CPU 41 judges whether an error caused by the user terminal 10 has occurred to prevent the generation of an image. For example, the CPU 41 judges whether, during the process of interpreting PDL commands included in the print request, a command which is not interpretable by the printer 20 is included in the print request or a non-standard value is set in the parameters of the PDL commands, or the use of A3-size sheets is set in the print conditions although the printer 20 can handle only up to the A4 size. If it is judged that an error caused by the user terminal 10 has occurred, the CPU 41 proceeds to step S170.

In step S170, the CPU 41 refers to the list 4 and judges whether the IP address of the user terminal 10 that has sent the print request is registered in the list 4. If the IP address of the user terminal 10 is registered in the list 4, the CPU 41 proceeds to step S180.

If the IP address of the user terminal 10 is registered in the list 4, it means that environment information concerning the user terminal 10 is included in the received print request, as discussed in steps S30 and S40 in FIG. 7.

In step S180, the CPU 41 extracts the environment information from the received print request.

In step S190, the CPU 41 relates the environment information extracted in step S180 to the print management ID of the print request in which an error caused by the user terminal 10 has occurred. The CPU 41 then stores the environment information in a storage region (non-volatile memory 44, for example) in which the management DB 26 is constructed. The CPU 41 also inputs the items of information concerning the error into the individual fields of the list 4 (error date, IP address of the user terminal 10, print management ID, and error code in the list 4 shown in FIG. 3). The CPU 41 then completes print processing shown in FIG. 8.

The CPU 41 may display error code representing the error type on the display unit 48B to inform a user that an error has occurred.

As a result of the above-described operation, the environment information concerning the user terminal 10 that has failed to print an image is stored in the printer 20. This enables a maintenance operator to obtain the environment information without operating the user terminal 10.

In this exemplary embodiment, the list 4 and the environment information concerning the user terminal 10 are stored in the same storage device. However, the list 4 and the environment information may be stored in physically different storage devices. Environment information concerning a user terminal 10 may contain personal information, such as a user ID and the application type used by a user. It is thus desirable to store the environment information in a more secure storage device than for the list 4.

Every time a user terminal 10 registered in the list 4 fails to print an image, environment information concerning this user terminal 10 is stored in a storage device. If environment information is stored in the non-volatile memory 44 with a limited storage capacity, the storage space of the non-volatile memory 44 becomes short. Instead of the non-volatile memory 44, a cloud service may be used, and the management DB 26 may be constructed in a storage device in the cloud service having a larger storage capacity than a storage device installed in the printer 20, and the list 4 and environment information may be stored in this storage device. In this case, not only a maintenance operator, but also an outside user, such as a developer of the printer driver 12, may also able to investigate the cause of an error.

If it is judged in step S170 that the IP address of the user terminal 10 that has sent the print request is not registered in the list 4, the CPU 41 proceeds to step S200.

In this case, an error caused by a user terminal 10 has occurred for the first time in this user terminal 10. In step S200, the CPU 41 thus inputs the date on which the error has occurred, the IP address of the user terminal 10, print management ID of the print request sent from this user terminal 10, and error code into the list 4, and completes print processing in FIG. 8. Thereafter, when this user terminal 10 requests the printer 20 to print an image, it appends environment information concerning the user terminal 10 to a print request. If an error caused by this user terminal 10 has occurred again, steps S180 and S190 are executed, and the environment information concerning the user terminal 10 is stored in the management DB 26.

If it is judged in step S160 that an error caused by the user terminal 10 has not occurred and an image is successfully drawn by the printer 20, the CPU 41 proceeds to step S210.

In step S210, the CPU 41 executes printing based on the generated image, and completes processing in FIG. 8.

In print request processing in FIG. 7 and print processing in FIG. 8, environment information concerning the user terminal 10 is included in a print request. The user terminal 10 may alternatively send a print request and environment information concerning the user terminal 10 separately to the printer 20. For example, step S40 may be omitted, and after sending a print request without environment information to the printer 20 in step S50, the CPU 31 may send the environment information obtained in step S30 to the printer 20.

If the user terminal 10 sends a print request and environment information separately, the CPU 41 sends a message to request the user terminal 10 to send environment information in step S180. This makes the user terminal 10 save sending environment information if image printing has successfully been completed. This can reduce the load on the user terminal 10 and the traffic in the communication network 2, compared with when the user terminal 10 sends environment information together with a print request to the printer 20 if the IP address of the user terminal 10 is registered in the list 4 regardless of whether image printing has succeeded or failed.

In print request processing in FIG. 7, if the IP address of the user terminal 10 is registered in the list 4 received from the printer 20, the user terminal 10 obtains environment information. However, before checking whether the IP address of the user terminal 10 is registered in the list 4, the user terminal 10 may obtain environment information and store it in the RAM 33 in advance.

In this modified processing, even if image printing has failed in the printer 20 for a print request sent from a user terminal 10 which is not registered in the list 4, environment information concerning this user terminal 10 when the print request has been sent is already stored in the user terminal 10. The CPU 41 of the printer 20 thus obtains the environment information from the user terminal 10 and stores it in the management DB 26 after step S200 in FIG. 8. In this manner, even if an error has occurred in a user terminal 10 that has sent a print request for the first time, the printer 20 can obtain environment information concerning this user terminal 10.

As discussed in step S30 in FIG. 7, if the IP address of the user terminal 10 is registered in the list 4, the CPU 31 obtains predetermined environment information from the user terminal 10. Alternatively, the printer 20 may specify the content of environment information to be obtained. More specifically, the printer 20 may add information concerning the content of environment information to be obtained from the user terminal 10 to printer information to be sent to the user terminal 10. The CPU 41 may not necessarily add this information to printer information and may send it separately from printer information to the user terminal 10.

Instead of specifying individual items of environment information to be obtained from the user terminal 10, the printer 20 may set the level of details of environment information, such as "level N (N is an integer)". The content of environment information to be obtained is determined for each of N levels so that, as the numerical value "N" is greater, more detailed environment information is sent from the user terminal 10. Then, the user terminal 10 obtains environment information in accordance with the level N set by the printer 20 and sends it to the printer 20. A maintenance operator, for example, may set the level of details of environment information by using the input unit 48A of the printer 20.

As discussed above, if the IP address of the user terminal 10 is registered in the list 4 received from the printer 20, the user terminal 10 sends environment information every time it requests the printer 20 to print an image. However, if, as a result of investigating the cause of an error, error handling is appropriately performed, such as the printer driver 12 is updated, for example, and the error caused by the user terminal 10 no longer occurs, environment information concerning the user terminal 10 becomes unnecessary. Even if the cause of an error has not been investigated, if a single piece of environment information is enough to find out the cause of a future error from this environment information, the user terminal 10 does not have to send environment information every time it requests the printer 20 to print an image.

Hence, the printer 20 may display a list editing screen on the display unit 48B in accordance with the operation of a maintenance operator. On the list editing screen, the IP address selected by the maintenance operator can be deleted from the list 4. If the maintenance operator has deleted a certain IP address on the list editing screen, the input unit 48A provides an instruction to delete this IP address from the list 4 to the CPU 41. The CPU 41 then deletes the list elements including this IP address of the corresponding error record from the list 4.

When the number of pieces of environment information received from a user terminal 10 has reached a preset reference value, even without an instruction from a maintenance operator, the printer 20 may delete the list elements including the IP address of this user terminal 10 of the corresponding error record from the list 4. The reference value may be the same value for all the user terminals 10 or may be different values for the individual user terminals 10.

In print processing shown in FIG. 8, in the case of an error caused by the printer 20, environment information concerning the user terminal 10 is not stored in the management DB 26. Among errors caused by the printer 20, however, an error, such as an image has not been printed as a user has intended, may be included. For example, although an image has been printed, part of a printed image is missing or character garbling has occurred in a printed image.

In this case, with environment information concerning the user terminal 10 that has made a request for printing an image, it may take less time to investigate the cause of an error than that only with information recorded in the printer 20.

Hence, the printer 20 may display a list editing screen on the display unit 48B in accordance with the operation of a maintenance operator. On the list editing screen, the IP address of a user terminal 10 selected by the maintenance operator can be registered in the list 4. If the maintenance operator has registered a certain IP address on the list editing screen, the input unit 48A provides an instruction to register this IP address in the list 4 to the CPU 41. The CPU 41 then registers this IP address in the list 4.

In this manner, as a result of a maintenance operator registering the IP address of a user terminal 10, even if an error, which is not an error caused by this user terminal 10, has occurred for a print request received from the user terminal 10, the printer 20 can obtain environment information concerning this user terminal 10.

If, instead of the IP address, the user ID is registered in the list 4 as information indicating a requester of a print service, the CPU 31 of the user terminal 10 judges in step S20 in FIG. 7 whether the user ID of a user operating the user terminal 10 is registered in the list 4 received from the printer 20. A user inputs its user ID when logging in the user terminal 10. The CPU 31 thus obtains the user ID managed by the OS as the user ID of the user operating the user terminal 10. The above-described list editing screen is also modified such that registration and deletion of user IDs in and from the list 4 is received.

The use of user IDs serves to investigate an error occurred in the printer 20 caused by a specific user operating the application 11, for example.

The list 4 may include multiple pieces of information indicating a requester of a print service, such as the IP address of a user terminal 10 and the user ID of a user operating the user terminal 10. In this case, if the IP address of the user terminal 10 and the user ID of the user operating the user terminal 10 match the IP address and the user ID registered in the list 4, the user terminal 10 sends environment information to the printer 20.

Modified Examples

In print processing in FIG. 8, the printer 20 sends the list 4 and causes the user terminal 10 to select whether to send environment information. Alternatively, the printer 20 may perform control to determine whether to cause the user terminal 10 to send environment information.

Figure 9:
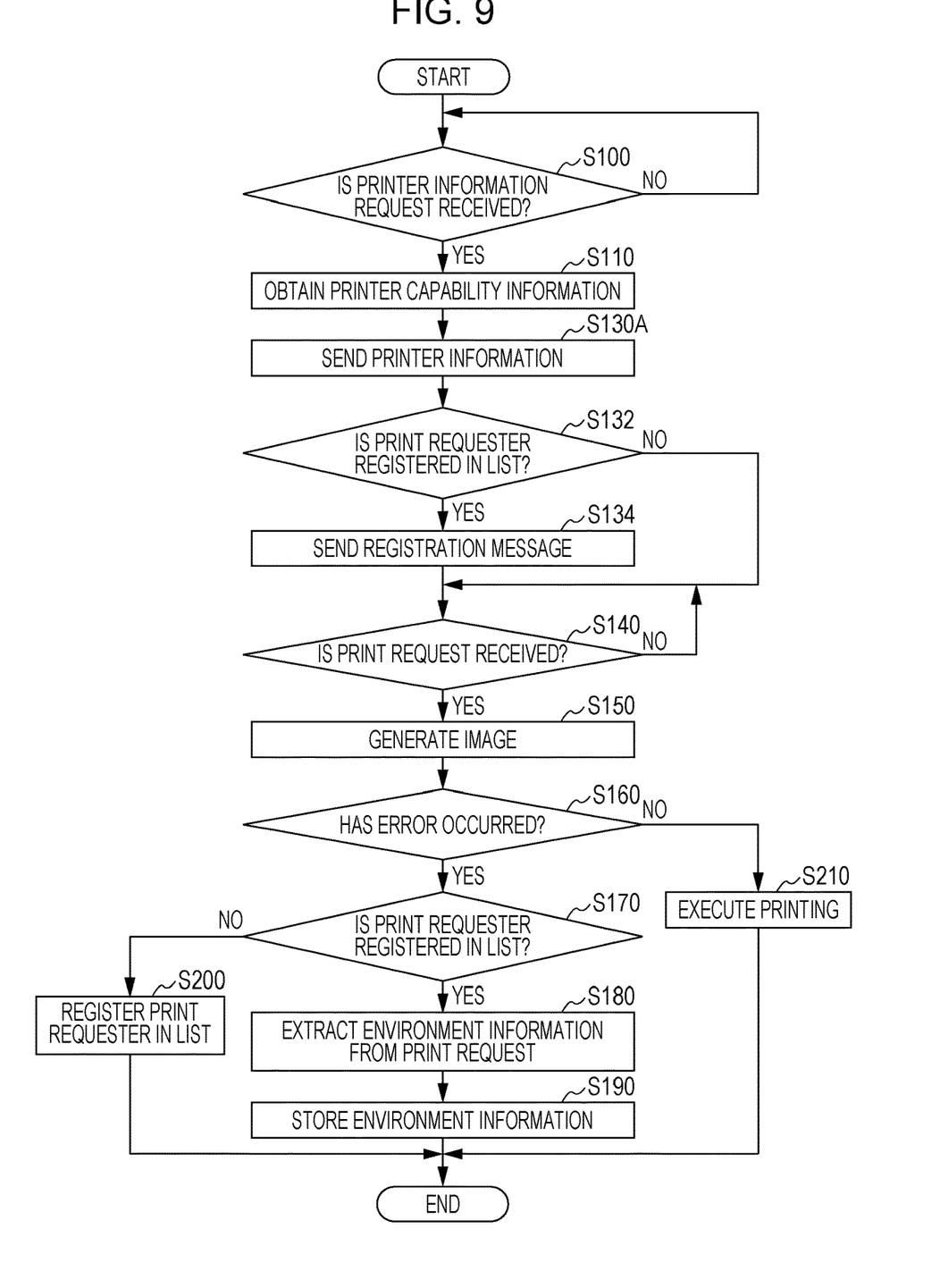
FIG. 9 is a flowchart illustrating a modified example of print processing executed by a printer.
Figure 10:
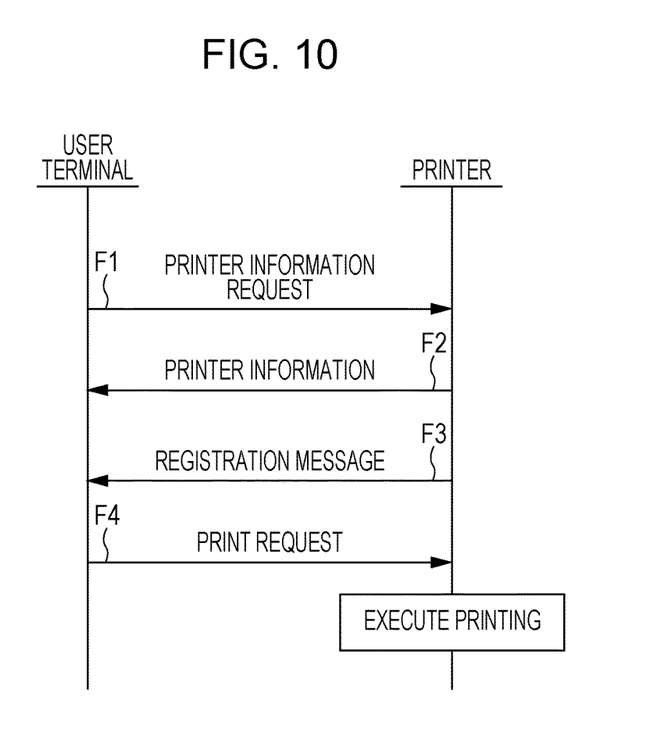
FIG. 10 is a sequence diagram illustrating a modified example of a sequence of sending and receiving messages between a user terminal and a printer.

FIG. 9 is a flowchart illustrating print processing executed by the CPU 41 of the printer 20 when the printer 20 is started according to a modified example of the exemplary embodiment. FIG. 10 is a sequence diagram illustrating an example of a sequence of sending and receiving messages between the user terminal 10 and the printer 20 when print processing of the modified example is executed.

Print processing in FIG. 9 is different from that in FIG. 8 in that step S120 is deleted, step S130 is replaced by step S130A, and steps S132 and S134 are added. Print processing according to the modified example will be described below mainly referring to steps different from print processing in FIG. 8.

In response to a printer information request from the user terminal 10 (see F1 in FIG. 10), the printer 20 obtains printer capability information in step S110 and then executes step S130A.

In step S130A, the CPU 41 generates printer information including the printer capability information obtained in step S110, and sends the generated printer information to the user terminal 10, which is the sender of the printer information request (see F2 in FIG. 10). That is, in printer processing according to the modified example, the printer information sent to the user terminal 10 does not include the list 4.

In step S132, the CPU 41 judges whether the IP address of the user terminal 10 that has sent the printer information request is registered in the list 4. If the IP address of the user terminal 10 is registered in the list 4, the CPU 41 proceeds to step S134.

In step S134, the CPU 41 sends a registration message to inform the user terminal 10 that the IP address of the user terminal 10 is registered in the list 4 (see F3 in FIG. 10), and proceeds to step S140.

Upon receiving the registration message, the user terminal 10 obtains environment information concerning the user terminal 10 and adds it to a print request.

If it is judged in step S132 that the IP address of the user terminal 10 is not registered in the list 4, the CPU 41 proceeds to step S140 by skipping step S134.

If a registration message is not received from the printer 20, the user terminal 10 generates a print request without environment information concerning the user terminal 10.

Thereafter, the CPU 41 executes step S140 onward and prints an image in accordance with the content of a print request sent from the user terminal 10 (see F4 in FIG. 10).

In print processing according to the above-described modified example, the printer 20 performs control to determine whether to cause the user terminal 10 to send environment information. If the printer 20 causes the user terminal 10 to send environment information, it sends a registration message to the user terminal 10. This enables the user terminal 10 to judge whether to send environment information to the printer 20 in accordance with whether or not a registration message is received from the printer 20.

As well as in the exemplary embodiment, in this modified example, the user terminal 10 may send a print request and environment information separately to the printer 20 without including the environment information in the print request.

In print processing shown in FIGS. 8 and 9, if information indicating a service requester, such as the IP address of a user terminal 10 or the user ID of a user operating the user terminal 10, is already registered in the list 4, the printer 20 obtains environment information concerning this service requester and is used to investigate the cause of an image printing error.

However, there may be a situation where a printing failure occurs, not due to an error unique to a specific user terminal 10, but due to the use of a specific application 11 regardless of which user terminal 10 is used. If the use of a specific application 11 is likely to be the reason for a printing failure in the printer 20, when a user has made a print request by using the specific application 11 from a user terminal 10, it is desirable for the printer 20 to obtain environment information concerning this user terminal 10 to investigate the cause of the printing failure.

In this case, the type of application 11 used for generating image data that has not been printed successfully is registered in the list 4. When a user terminal 10 generates image data by using an application 11 registered in the list 4 and requests the printer 20 to print this image data, it sends environment information to the printer 20.

Figure 11:
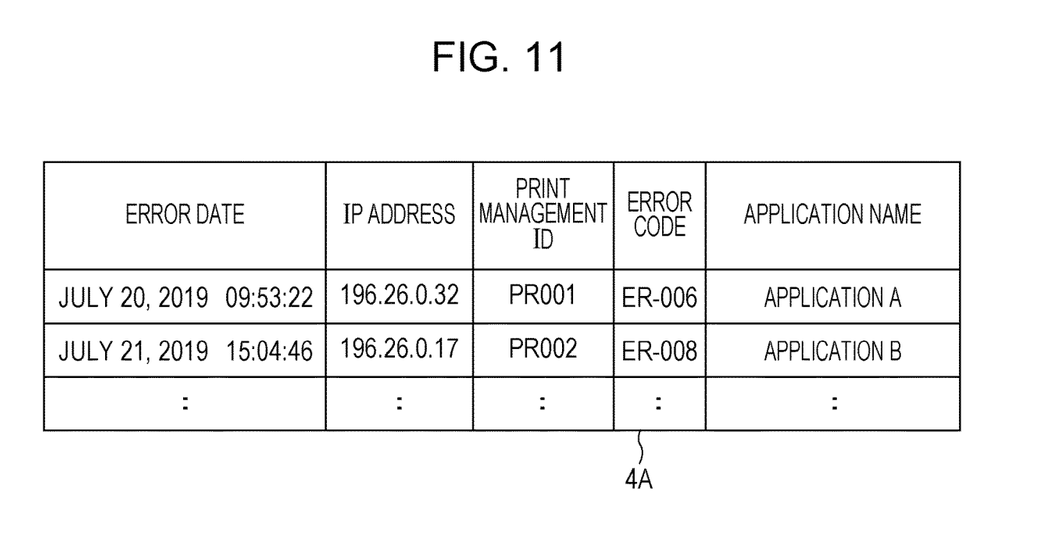
FIG. 11 illustrates an example of a list in which the application type is registered.

FIG. 11 illustrates an example of a list 4A in which the application type is registered. As the application type, an application name, for example, is registered in the list 4A.

In this case, in step S20 of print request processing in FIG. 7, the CPU 31 of the user terminal 10 judges whether the name of the application used for giving a print execute instruction is registered in the application name of the list 4A. If the name of the application is registered in the list 4A, the CPU 31 proceeds to step S30. If the name of the application is not registered in the list 4A, the CPU 31 proceeds to step S50. When sending environment information to the printer 20, the CPU 31 adds the name of the application to the environment information.

Regarding information indicating which item of information in the list 4 is used to judge in step S20 in FIG. 7 whether the subject corresponding to this item of information is registered in the list 4 (hereinafter such information will be called judging subject information), the printer 20 adds this judging subject information to printer information to be supplied to the user terminal 10. In the above-described case, the judging subject information indicates "application name".

If the judging subject information indicates "application name", in step S170 of print processing in FIG. 8, the CPU 41 of the printer 20 checks the list 4A and judges whether the name of the application used in the user terminal 10 is registered in the list 4A. If the name of the application is registered in the list 4A, the CPU 41 proceeds to step S180 and stores environment information concerning the user terminal 10 in the management DB 26. If the name of the application is not registered in the list 4A, the CPU 41 proceeds to step S200 and registers the name of the application used in the user terminal 10 in the list 4A.

In print processing in FIG. 9, in step S132, the CPU 41 of the printer 20 judges whether the name of the application included in the received printer information request is registered in the list 4A. If the name of the application is registered in the list 4A, the CPU 41 proceeds to step S134 and sends a registration message to the user terminal 10. If the name of the application is not registered in the list 4A, the CPU 41 proceeds to step S140 without sending a registration message to the user terminal 10. Then, the CPU 41 executes the same processing as step S170 in FIG. 8.

For each application 11, the printer 20 may count the number of print requests for which the printer 20 has failed to print an image and calculate the ratio of the number of such print requests to the total number of print requests received from user terminals 10. This ratio will be called a failure ratio. When the failure ratio has reached a reference value, the judging subject information may be changed to the application name. Then, when a user terminal 10 makes a print request by using an application 11 for which the failure ratio is calculated to be greater than or equal to the reference value, it sends environment information concerning the user terminal 10.

As the type of application 11, instead of an individual application name, the name of a company having developed an application 11 or the name of an application category representing the characteristic of an application 11, such as a spreadsheet application and a drawing application, may be registered in the list 4A.

As the judging subject information, instead of information concerning a service requester, such as the IP address of a user terminal 10, and the application type, another item of information, such as the model name of a user terminal 10, a time range which restricts a time for sending a print request, and error code, may be used. A combination of plural items of information may be set as the judging subject information. For example, if the IP address of a user terminal 10 and the application name are used as the judging subject information, the CPU 41 of the printer 20 judges whether the IP address of a user terminal 10 and the application 11 used in the user terminal 10 are both registered in the list 4 or 4A.

The present disclosure has been discussed through illustration of the exemplary embodiment. However, the disclosure is not restricted to the scope of the above-described exemplary embodiment. The disclosure may be applicable to the following situation. An information processing apparatus provides a service in response to a request from a user. When this information processing apparatus has failed to provide a service due to the occurrence of an error, environment information concerning a user terminal 10 used for making a request for a service is required to investigate the cause of the error. More specifically, the disclosure is applicable to the use of online shopping, social networking services, net banking, and cloud services, for example.

Various modifications and/or improvements may be made to the exemplary embodiment without departing from the spirit and scope of the disclosure. Exemplary embodiments obtained by making modifications and/or improvements are also encompassed within the scope of the disclosure. For example, the order of operations may be changed without departing from the spirit and scope of the disclosure.

In the above-described exemplary embodiment, print request processing and print processing are implemented by software by way of example. However, operations equivalent to those in the flowcharts of FIGS. 7 through 9 may be implemented by using hardware, such as an application specific integrated circuit (ASIC). In this case, print request processing and print processing are executed faster than using software.

Although the terminal program is installed in the ROM 32 and the information processing program is installed in the ROM 42 in the above-described exemplary embodiment, they may be provided in a different manner. For example, the terminal program and the information processing program may be provided as a result of being recorded in a computer-readable storage medium, such as an optical disc (a compact disc (CD)-ROM or a digital versatile disc (DVD)-ROM), or in a portable semiconductor memory, such as a universal serial bus (USB) memory and a memory card.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to
        obtain environment information concerning a user terminal when a service request is received from the user terminal, providing of a service to the user terminal having previously failed;
        store the environment information obtained in a storage device, data being read from and written into the storage device without operating the user terminal;
        cause the user terminal having sent the service request to send the environment information by using requester information indicating a service requester for which providing of the service has previously failed;
        specify content of the environment information to be sent from the user terminal; and
        specify a level of details of the environment information to be sent from the user terminal.

2. The information processing apparatus according to claim 1, wherein, if information concerning the service requester indicating the user terminal is included in the requester information, the processor is configured to cause the user terminal to send the environment information concerning the user terminal.

3. The information processing apparatus according to claim 2, wherein the processor is configured to specify content of the environment information to be sent from the user terminal.

4. The information processing apparatus according to claim 2, wherein
    athe processor is configured to receive a register instruction to register information concerning the service requester in the requester information and a delete instruction to delete information concerning the service requester from the requester information, and
    if the processor has received the register instruction, the processor is configured to register information concerning the service requester described in the register instruction in the requester information, and if the processor has received the delete instruction, the processor is configured to delete information concerning the service requester described in the delete instruction from the requester information.

5. The information processing apparatus according to claim 1, wherein the processor is configured to send the requester information to the user terminal and to cause the user terminal to select whether to send the environment information concerning the user terminal.

6. The information processing apparatus according to claim 5, wherein the processor is configured to specify content of the environment information to be sent from the user terminal.

7. The information processing apparatus according to claim 5, wherein
    the processor is configured to receive a register instruction to register information concerning the service requester in the requester information and a delete instruction to delete information concerning the service requester from the requester information, and
    if the processor has received the register instruction, the processor is configured to register information concerning the service requester described in the register instruction in the requester information, and if the receiver has received the delete instruction, the processor is configured to delete information concerning the service requester described in the delete instruction from the requester information.

8. The information processing apparatus according to claim 1, wherein
    the processor is configured to receive a register instruction to register information concerning the service requester in the requester information and a delete instruction to delete information concerning the service requester from the requester information, and
    if the processor has received the register instruction, the processor is configured to register information concerning the service requester described in the register instruction in the requester information, and if the processor has received the delete instruction, the processor is configured to delete information concerning the service requester described in the delete instruction from the requester information.

9. The information processing apparatus according to claim 8, wherein, before the processor obtains the environment information concerning the user terminal, in accordance with an application type executed in the user terminal and used for providing the service request, the processor is configured to determine whether to obtain the environment information concerning the user terminal.

10. The information processing apparatus according to claim 1, wherein, before the processor obtains the environment information concerning the user terminal, in accordance with an application type executed in the user terminal and used for providing the service request, the processor is configured to determine whether to obtain the environment information concerning the user terminal.

11. The information processing apparatus according to claim 10, wherein:
for each application used for providing the service request, the processor is configured to count the number of service requests for which providing of the service has failed and calculate a ratio of the counted number to the number of received service requests; and
when the service request is received from the user terminal by using an application for which the ratio is calculated to be greater than or equal to a predetermined value, the processor is configured to obtain the environment information concerning the user terminal.

12. A non-transitory computer readable medium storing a program causing a computer to execute a process, the process comprising:
obtaining environment information concerning a user terminal when a service request is received from the user terminal, providing of a service to the user terminal having previously failed;
performing control to store the environment information in a storage device, data being read from and written into the storage device without operating the user terminal;
causing the user terminal having sent the service request to send the environment information by using requester information indicating a service requester for which providing of the service has previously failed;
specifying content of the environment information to be sent from the user terminal; and
specifying a level of details of the environment information to be sent from the user terminal.

13. An information processing system comprising:
an information processing apparatus and a user terminal,
the information processing apparatus including a first processor configured to
obtain environment information concerning the user terminal when a service request is received from the user terminal, providing of a service to the user terminal having previously failed,
specify content of the environment information to be sent from the user terminal,
specify a level of details of the environment information to be sent from the user terminal, and
store the environment information obtained in a storage device, data being read from and written into the storage device without operating the user terminal; and
the user terminal including second processor configured to
send a request for the service to be provided by the information processing apparatus to the information processing apparatus, and
send the environment information indicating a service requester for which providing of the service has previously failed to the information processing apparatus.

14. An information processing apparatus comprising:
a storage that stores information on a user terminal in a case where the information processing apparatus has failed to provide a first service requested by the user terminal; and
a processor configured to
obtain, in response to a request for a second service being received from the user terminal, environment information of the user terminal while providing the second service to the user terminal,
store the environment information obtained in the storage,
cause the user terminal having sent a service request to send the environment information by using requester information indicating a service requester for which providing of the first service has previously failed,
specify content of the environment information to be sent from the user terminal, and
specify a level of details of the environment information to be sent from the user terminal.

* * * * *